United States Patent
Wang et al.

(10) Patent No.: US 12,026,613 B2
(45) Date of Patent: Jul. 2, 2024

(54) TRANSFER LEARNING ACROSS AUTOMATED MACHINE LEARNING SYSTEMS

(71) Applicant: International Business Machines Corporation, Armonk, NY (US)

(72) Inventors: Dakuo Wang, Cambridge, MA (US); Ming Tan, Malden, MA (US); Chuang Gan, Cambridge, MA (US); Jason Tsay, White Plains, NY (US); Gregory Bramble, Larchmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1016 days.

(21) Appl. No.: 16/806,626

(22) Filed: Mar. 2, 2020

(65) Prior Publication Data
US 2021/0271966 A1   Sep. 2, 2021

(51) Int. Cl.
*G06N 3/08* (2023.01)
*G06N 3/045* (2023.01)
*G06N 20/20* (2019.01)

(52) U.S. Cl.
CPC ............ *G06N 3/08* (2013.01); *G06N 3/045* (2023.01); *G06N 20/20* (2019.01)

(58) Field of Classification Search
CPC .......... G06N 3/08; G06N 3/045; G06N 20/20; G06N 20/00
See application file for complete search history.

(56) References Cited

U.S. PATENT DOCUMENTS

| | | |
|---|---|---|
| 10,417,350 B1 | 9/2019 | Mohamed et al. |
| 10,523,682 B1 | 12/2019 | Badawy et al. |
| 2009/0097733 A1* | 4/2009 | Hero, III ............ G01N 15/1459 382/160 |
| 2018/0018590 A1 | 1/2018 | Szeto et al. |
| 2018/0314975 A1* | 11/2018 | Zang ........................ G06N 20/20 |
| 2019/0102693 A1* | 4/2019 | Yates ........................ G06N 20/00 |

(Continued)

OTHER PUBLICATIONS

Crawshaw M. Multi-task learning with deep neural networks: A survey. arXiv preprint arXiv:2009.09796. Sep. 10, 2020. (Year: 2020).*

(Continued)

*Primary Examiner* — Oluwatosin Alabi
(74) *Attorney, Agent, or Firm* — Amin, Turocy & Watson, LLP

(57) ABSTRACT

Techniques regarding transferring learning outcomes across machine learning tasks in automated machine learning systems are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a transfer learning component that can executes a machine learning task using an existing artificial intelligence model on a sample dataset based on a similarity between the sample dataset and a historical dataset. The existing artificial intelligence model can be generated by automated machine learning and trained on the historical dataset.

20 Claims, 12 Drawing Sheets

(56) References Cited

U.S. PATENT DOCUMENTS

| | | | | |
|---|---|---|---|---|
| 2020/0334520 | A1* | 10/2020 | Chen | G06F 40/216 |
| 2021/0103858 | A1* | 4/2021 | Padmanabhan | G06F 18/24765 |
| 2021/0142164 | A1* | 5/2021 | Liu | G06F 40/216 |
| 2021/0192357 | A1* | 6/2021 | Sinha | G06N 3/084 |

OTHER PUBLICATIONS

Ma, S., Xing, Z., Chen, C., Chen, C., Qu, L. and Li, G., 2019. Easy-to-deploy API extraction by multi-level feature embedding and transfer learning. IEEE Transactions on Software Engineering, 47(10), pp. 2296-2311. (Year: 2019).*

Alsing, O., 2018. Mobile object detection using tensorflow lite and transfer learning. (Year: 2018).*

Jamshidi P, Siegmund N, Velez M, Kästner C, Patel A, Agarwal Y. Transfer learning for performance modeling of configurable systems: An exploratory analysis. In2017 32nd IEEE/ACM International Conference on Automated Software Engineering (ASE) Oct. 30, 2017 (pp. 497-508). IEEE. (Year: 2017).*

Scott, Tyler, Karl Ridgeway, and Michael C. Mozer. "Adapted deep embeddings: A synthesis of methods for k-shot inductive transfer learning." Advances in Neural Information Processing Systems 31 (2018). (Year: 2018).*

Cirqueira D, Helfert M, Bezbradica M. Towards preprocessing guidelines for neural network embedding of customer behavior in digital retail. InProceedings of the 2019 3rd International Symposium on Computer Science and Intelligent Control Sep. 25, 2019 (pp. 1-6). (Year: 2019).*

Amershi, et al. "Power to the People: The Role of Humans in Interactive Machine Learning" AI Magazine, 35(4), 105-120. 24 pages, Mar. 2, 2020.

Amershi, et al. "Guidelines for Human-AI Interaction" Proceedings of the 2019 CHI Conference on Human Factors in Computing Systems. ACM, 3. 13 pages.

Armstrong, et al. "How We're Predicting AI—or Failing to" https://aiimpacts.org/ error-in-armstrong-and-sotala-2012/. 23 pages.

Bayles, et al. Art & fear: "Observations on the perils (and rewards) of artmaking." Image Continuum Press. 2001. 114 pages.

Bellamy, et al. "AI Fairness 360: An Extensible Toolkit for Detecting, Understanding, and Mitigating Unwanted Algorithmic Bias" arXiv:1810.01943v1 [cs.AI] Oct. 3, 2018. 20 pages.

Blake, et al. "UCI Machine Learning Repository: Center for Machine Learning & Intelligent Systems" archive.ics.uci.edu/ml/index.php, Last Accessed Jun. 8, 2020.

Campbell, et al. "Deep Blue" Artificial Intelligence 134 (2002) 57-83, 27 pages.

Claure, et al. "Reinforcement Learning with Fairness Constraints for Resource Distribution in Human-Robot Teams." arXiv:1907.00313v2 [cs.AI] Jul. 8, 2019. 16 pages.

Cranshaw, et al. "Calendar.help: Designing a Workflow-Based Scheduling Agent with Humans in the Loop" CHI 2017, May 6-11, 2017, Denver, CO, USA. 12 pages.

Nguyen, et al. "Predict Saturated Thickness using TensorBoard Visualization" Proceedings of the Workshop on Visualisation in Environmental Sciences. Eurographics Association, 35-39. 5 pages, Mar. 2, 2020.

"Data Robot: Enabling the AI-Driven Enterprise" https://www.datarobot.com/ Last Accessed Jun. 1, 2020.

Dourish, et al. "Awareness and Coordination in Shared Workspaces" CSCW 92 Proceedings. 9 pages, Mar. 2, 2020.

"A Python Automated Machine Learning tool that optimizes machine learning pipelines using genetic programming." https://github.com/EpistasisLab/tpot. Last Accessed Jun. 1, 2020. 7 pages.

Erickson, et al. "Social Translucence: An Approach to Designing Systems that Support Social Processes" ACM Transactions on Computer-Human Interaction, vol. 7, No. 1, Mar. 2000, pp. 59-83. 25 pages.

Feurer, et al. "Efficient and Robust Automated Machine Learning" Advances in Neural Information Processing Systems. 2962-2970. 9 pages, Mar. 2, 2020.

Gergle, et al. "Experimental Research in HCI" Ways of Knowing in HCI. Springer, 191-227. 30 pages, Mar. 2, 2020.

Gil, et al. "Towards Human-Guided Machine Learning" Proceedings of the 24th International Conference on Intelligent User Interfaces. ACM, 614-624. 11 pages, Mar. 2, 2020.

"Cloud AutoML" Google Cloud, https://cloud.google.com/automl/. Last Accessed Jun. 1, 2020. 10 pages.

"Colaboratory" Colaboratory, https://colab.research.google.com/notebooks/intro.ipynb. Last Accessed Jun. 1, 2020. 4 pages.

Grudin "AI and HCI: Two fields divided by a Common Focus" AI Magazine, Association for the Advancement of Artificial Intelligence. 2009. 10 pages.

He, et al. "AMC: AutoML for Model Compression and Acceleration on Mobile Devices" arXiv:1802.03494v4 [cs.CV] Jan. 16, 2019. 17 pages.

Heer, et al. "Voyagers and Voyeurs: Supporting Asynchronous collaborative information visualization." Proceedings of the SIGCHI conference on Human factors in computing systems. ACM, 1029-1038. 10 pages, Mar. 2, 2020.

Hoffman, et al. "Metrics for Explainable AI: Challenges and Prospects" arXiv preprint arXiv:1812.04608 (2018). 50 pages.

"Jupyter" Jupyter, https://jupyter.org/. Last Accessed Jun. 1, 2020. 10 pages.

"Jupyterlab" GitHub, https://github.com/jupyterlab/jupyterlab, Last Accessed Jun. 1, 2020. 5 pages.

Kaggle "2017 Kaggle ML & DS Survey: A big picture view of the state of data science and machine learning." https://www.kaggle.com/kaggle/kaggle-survey-2017. Last Accessed Jun. 8, 2020, 1 page.

Kaggle "2018 Kaggle ML & DS Survey: The most comprehensive dataset available on the state of ML and data science" https://www.kaggle.com/kaggle/kaggle-survey-2018, Last Accessed Jun. 8, 2020, 11 pages.

Kandel, et al. "Wrangler: interactive visual specification of data transformation scripts" CHI '11: Proceedings of the SIGCHI Conference on Human Factors in Computing SystemsMay 2011 pp. 3363-3372, https://doi.org/10.1145/1978942.1979444, 10 pages.

Kanter, et al. "Deep Feature Synthesis: Towards Automating Data Science Endeavors" 2015 IEEE International Conference on Data Science and Advanced Analytics (DSAA). IEEE, 1-10. 10 pages.

Kerry, et al. "The Story in the Notebook: Exploratory Data Science using a Literate Programming Tool" CHI '18: Proceedings of the 2018 CHI Conference on Human Factors in Computing Systems, Apr. 2018, https://doi.org/10.1145/3173574.3173748, 11 pages.

Lam, et al. "One button machine for automating feature engineering in relational databases" arXiv:1706.00327v1 [cs.DB] Jun. 1, 2017, 9 pages.

Li "How to Make A.I. That's Good for People" The New York Times, https://www.blog.google/perspectives/fei-fei-li/how-make-ai-good-for-people/, Apr. 7, 2018, 7 pages.

Markoff "Computer Wins on 'Jeopardy!': Trivial, It's Not" The New York Times, https://www.ndtv.com/world-news/computer-wins-on-jeopardy-trivial-its-not-447971, Feb. 17, 2011, 7 pages.

Tussyadiah, et al. "Attitudes toward autonomous on demand mobility system: The case of self-driving taxi" Information and Communication Technologies in Tourism 2017. Springer. 13 pages.

Mok, et al. Tunneled in: Drivers with active secondary tasks need more time to transition from automation CHI '17: Proceedings of the 2017 CHI Conference on Human Factors in Computing Systems, May 2017, pp. 2840-2844, https://doi.org/10.1145/3025453.3025713, 5 pages.

Nass, et al. "Computers are social actors" CHI '94, Human Factors in Computing Systems, 7 pages, Mar. 2, 2020.

Olson, et al. "TPOT: A Tree-based Pipeline Optimization Tool for Automating Machine Learning" Workshop on Automatic Machine Learning. 66-74, 2016, 11 pages.

Passi, et al. "Data Vision: Learning to See Through Algorithmic Abstraction" CSCW '17: Proceedings of the 2017 ACM Conference

(56) References Cited

OTHER PUBLICATIONS on Computer Supported Cooperative Work and Social Computing, Feb. 2017, pp. 2436-2447, https://doi.org/10.1145/2998181.2998331, 12 pages.
Pedregosa, et al. "Scikit-learn: Machine Learning in Python" The Journal of Machine Learning Research, Nov. 2011, 6 pages.
Perez, et al. "Project Jupyter: Computational narratives as the engine of collaborative data science" Jul. 7, 2015, https://blog.jupyter.org/project-jupyter-computational-narratives-as-the-engine-of-collaborative-datascience-2b5fb94c3c58, 60 pages.
Pine, et al. "The politics of measurement and action" CHI 2015, Apr. 18-23, 2015, Seoul, Republic of Korea, DOI: 10.1145/2702123.2702298, 11 pages.
Rattenbury, et al,. "Principles of Data Wrangling: Practical Techniques for Data Preparation" O'Reilly Media, 2017, 114 pages.
Borojeni, et al. "Looking into the future: weaving the threads of vehicle automation: weaving the threads of vehicle automation" CHI EA '19: Extended Abstracts of the 2019 CHI Conference on Human Factors in Computing Systems, May 2019, pp. 1-8, https://doi.org/10.1145/3290607.3299031, 8 pages.
Shamekhi, et al. "Face Value? Exploring the Effects of Embodiment for a Group Facilitation Agent" CHI 2018, Apr. 21-26, 2018, Montreal, QC, Canada, https://doi.org/10.1145/3173574.3173965, 14 pages.
Shneiderman, et al. "Direct manipulation vs. interface agents" Interactions, Nov. 1997, https://doi.org/10.1145/267505.267514, 20 pages.
Simon "Forget the Robot Singularity Apocalypse. Let's Talk About the Multiplicity" Wired, https://www.wired.com/story/forget-the-robot-singularity-apocalypse-lets-talk-about-the-multiplicity/, Jan. 18, 2018, 4 pages.
Sukis "AI Design & Practices Guidelines" Medium, https://medium.com/design-ibm/ai-design-guidelines-e0617e92d864, May 25, 2018, 9 pages.
Sutton, et al. "DataDiff: Interpretable, Executable Summaries of Changes in Distributions for DataWrangling" KDD'18, Aug. 2018, London, UK, 9 pages.
Tan, et al. "Projecting Life Onto Robots: The Effects of Cultural Factors and Design Type on Multi-Level Evaluations of Robot Anthropomorphism" 2018 27th IEEE International Symposium on Robot and Human Interactive Communication (RO-MAN), 10.1109/ROMAN.2018.8525584, 9 pages.
Kolanovic, et al."Big Data and AI Strategies—Machine Learning and Alternative Data Approach to Investing." https://faculty.sites.uci.edu/pjorion/files/2018/05/JPM-2017-MachineLearningInvestments.pdf May 2017. 280 pages.
Osoba, et al. "An Intelligence in Our Image." https://www.rand.org/pubs/research_reports/RR1744.html. 2017. 45 pages.
Anonymously. "Applying Machine Learning Techniques to Determine Product Risks." ip.com, Jan. 7, 2019. 29 pages.
Anonymously. "Configuring an Application Based on Settings in Similar Applications." ip.com, Jan. 5, 2018. 36 pags.
Anonymously. "Ranking and Automatic Selection of Machine Learning Models." ip.com, Jan. 3, 2018. 34 pages.
Anonymously. "Automatically Scaling Multi-Tenant Machine Learning." ip.com, Dec. 15, 2017. 35 pages.
He, et al. "Amc: Automl for model compression and acceleration on mobile devices." arXiv:1802.03494v4 [cs.CV] Jan. 16, 2019. In Proceedings of the European Conference on Computer Vision (ECCV) (pp. 784-800). 17 pages.
Wong, et al. "Transfer learning with neural autoML." In Advances in Neural Information Processing Systems (pp. 8356-8365). 2018. 10 pages.
Screen captures from IBM MediaCenter entitled "Automated AI and Machine Learning" https://mediacenter.ibm.com/media/IBM+Watson+StudioA+AutoAI+%26+Machine+Learning/0_hnlwqp5i. Uploaded by "550001NX30 55001 NX30" on May 13, 2019. Last Accessed Feb. 21, 2020.
Drozdal, et al. "Trust in AutoML: Exploring Information Needs for Establishing Trust in Automated Machine Learning Systems." arXiv:2001.06509v1 [cs.LG] Jan. 17, 2020. 11 pages.
Khurana, et al. "Cognito: Automated feature engineering for supervised learning." IEEE 16th International Conference on Data Mining Workshops (ICDMW). IEEE, 1304-1307. 2016. 4 pages.
Kross, et al. "Practitioners Teaching Data Science in Industry and Academia: Expectations, Workflows, and Challenges." In Proceedings of the 2019 CHI Conference on Human Factors in Computing Systems. ACM, 263. 4 pages.
Liu, et al. "An ADMM Based Framework for AutoML Pipeline Configuration." arXiv:1905.00424v5 [cs.LG] Dec. 6, 2019. 30 pages.
Mao, et al. "How Data Scientists Work Together With Domain Experts in Scientific Collaborations: To Find the Right Answer or to Ask the Right Question?." Proceedings of the ACM on Human-Computer Interaction 3, Group (Dec. 2019). 23 pages.
Muller, et al. "How Data Science Workers Work with Data: Discovery, Capture, Curation, Design, Creation." CHI '19: Proceedings of the 2019 CHI Conference on Human Factors in Computing SystemsMay 2019 Paper No. 126 pp. 1-15https://doi.org/10.1145/3290605.3300356. 16 pages.
Wang, et al. "Human-AI Collaboration in Data Science: Exploring Data Scientists." arXiv:1909.02309v1 [cs.HC] Sep. 5, 2019. 24 pages.
Wang, et al. "ATMSeer: Increasing Transparency and Controllability in Automated Machine Learning." arXiv:1902.05009v1 [cs.LG] Feb. 13, 2019. 12 pages.
Weidele. "Conditional Parallel Coordinates." arXiv:1906.07716v2 [cs.HC] Aug. 12, 2019. 5 pages.
Weidele, et al. "AutoAIViz: Opening the Blackbox of Automated Artificial Intelligence with Conditional Parallel Coordinates." arXiv:1912.06723v3 [cs.LG] Jan. 17, 2020. 5 pages.
Zhang, et al. "How do Data Science Workers Collaborate?: Roles, Workflows, and Tools." arXiv:2001.06684v2 [cs. HC] Jan. 26, 2020. 23 pages.
Mell, Peter, et al. "The NIST Definition of Cloud Computing." National Institute of Standards and Technology. Sep. 2011. 7 pages.
Aggarwal, et al. "How can AI Automate End-to-End Data Science?" arXiv:1910.14436v1 [cs.AI] Oct. 22, 2019. 8 pages.
"Make Your Company An AI Company." H2O.ai, https://www.h2o.ai/. Last Accessed Mar. 2, 2020. 2 pages.
Wang, et al. "Where Does AlphaGo Go: From Church-Turing Thesis to AlphaGo Thesis and Beyond" IEEE/CAA Journal of Automatica Sinica, vol. 3, No. 2, Apr. 2016, 8 pages.
Zhang, et al. "Towards an Optimal Dialog Strategy for Information Retrieval Using Both Open-and Close-ended Questions" IUI'18, Mar. 7-11, 2018, Tokyo, Japan, https://dl.acm.org/doi/10.1145/3172944.3172998, 5 pages.
Zoller, et al. "Benchmark and Survey of Automated Machine Learning Frameworks" arXiv:1904.12054v2 [cs.LG] Jan. 8, 2020, 64 pages.
Guo, et al. "Proactive wrangling: mixed-initiative end-user programming of data transformation scripts" Proceedings of the 24th annual ACM symposium on User interface software and technology. ACM, 65-74. 2011, 10 pages.
Schwab "Google's Rules for Designers Working with AI" Fast Company, https://www.fastcompany.com/90132700/googles-rules-for-designing-ai-that-isnt-evil, Last Accessed Jul. 1, 2020. 6 pages.
Miles et al., "Applying Regression and Correlation: A Guide for Students and Researchers", Sage, 2001.

* cited by examiner

402 →

| Name | Columns | Size | Col_1_name | Col_1_min | Col_2_name | Description | ... |
|---|---|---|---|---|---|---|---|
| EHR.cvs | 10 | 12MB | sb | 50 | ... | electronic employment record data | ... |
| BMR.cvs | 5 | 21MB | sb | 40 | ... | | ... |
| ... | | | | | | | |

404 →

| Job_id | user | Predict Type | Constraint | Feature Engineering | Deep Learning | ... |
|---|---|---|---|---|---|---|
| 1 | User_1 | Binary | Predict Time | 0 | 1 | ... |
| 2 | User_1 | Binary | Predict Time | 1 | 0 | ... |
| ... | | | | | | |

FIG. 4

| Job | Dataset | Configuration Setting | Result Pipelines | Similarity Score |
|---|---|---|---|---|
| 1 | EHR.csv | Config_1 | 1,2,3,4 | 0.9 |
| 2 | EMR.csv | Config_2 | 5,6,... 10 | 0.5 |
| ... | ... | ... | ... | ... |

EMPLOYING, BY A SYSTEM OPERATIVELY COUPLED TO A PROCESSOR, AN ARTIFICIAL INTELLIGENCE MODEL TO DETERMINE A SIMILARITY SCORE THAT CHARACTERIZES A SIMILARITY BETWEEN A SAMPLE DATASET AND A HISTORICAL DATASET — 802

EXECUTING, BY THE SYSTEM, A MACHINE LEARNING TASK USING AN EXISTING ARTIFICIAL INTELLIGENCE MODEL ON THE SAMPLE DATASET BASED ON THE SIMILARITY SCORE, WHEREIN THE EXISTING ARTIFICIAL INTELLIGENCE MODEL IS GENERATED BY AUTOMATED MACHINE LEARNING AND TRAINED ON THE HISTORICAL DATASET — 804

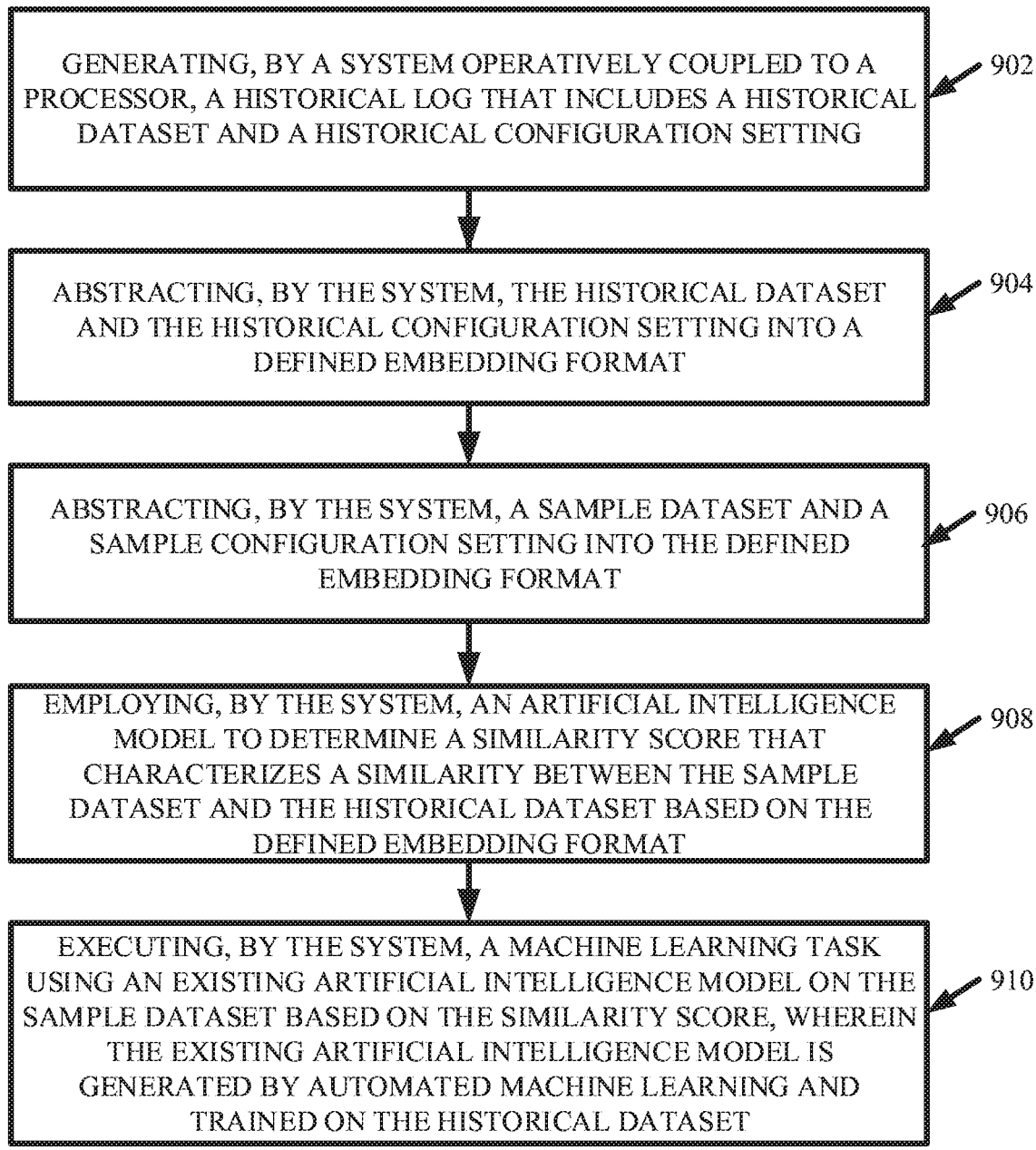

TRANSFER LEARNING ACROSS AUTOMATED MACHINE LEARNING SYSTEMS

BACKGROUND

The subject disclosure relates to transferring learning outcomes across one or more machine learning tasks and/or datasets in one or more automated machine learning systems, and more specifically, to adapting an existing artificial intelligence model to execute a machine learning task on a sample dataset based on a similarity between at least the parameters of the artificial intelligence model and the sample dataset.

Automated machine learning comprises the use of programs and algorithms to automate the end-to-end building and operationalizing of an artificial intelligence model. Thereby, automated machine learning can utilize artificial intelligence to design, create, and/or optimize an artificial intelligence model to complete a machine learning task. Automated machine learning systems can generate exponentially more artificial intelligence models than can be traditionally crafted by data scientists.

However, conventional automated machine learning systems generate new, separate, and independent artificial intelligence models for each machine learning task. For example, automated machine learning systems will traditionally execute the complete end-to-end process to each respective dataset and/or configuration setting provided. Thereby, each execution of a machine learning task by an automated machine learning system can be costly in computer resources and/or time.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can regard transfer learning across artificial intelligence models generated by automated machine learning are described.

According to an embodiment, a system is provided. The system can comprise a memory that can store computer executable components. The system can also comprise a processor, operably coupled to the memory, and that can execute the computer executable components stored in the memory. The computer executable components can comprise a transfer learning component that can execute a machine learning task using an existing artificial intelligence model on a sample dataset based on a similarity between the sample dataset and a historical dataset. The existing artificial intelligence model can be generated by automated machine learning and trained on the historical dataset. An advantage of such a system can be the enabled use of machine learning techniques be persons other than data scientist experts.

In some examples, the system can also comprise a similarity component that can determine a plurality of similarity scores between a plurality of existing artificial intelligence models generated by automated machine learning and the machine learning task. An advantage of such a system can be determining the similarity between past artificial intelligence models and a given machine learning task.

According to an embodiment, a computer-implemented method is provided. The computer-implemented method can comprise executing, by a system operatively coupled to a processor, a machine learning task using an existing artificial intelligence model on a sample dataset based on a similarity between the sample dataset and a historical dataset. The existing artificial intelligence model can be generated by automated machine learning and trained on the historical dataset. An advantage of such a computer-implemented method can be the accelerated training of artificial intelligence models by automated machine learning processes.

In some examples, the computer-implemented method can also comprise generating, by the system, a historical log that can include the historical dataset and a historical configuration setting. The existing artificial intelligence model can be trained on the historical dataset using the historical configuration setting. The computer-implemented method can further comprise abstracting, by the system, the sample dataset and a configuration setting of the machine learning task into a defined embedding format. Also, the computer-implemented method can comprise abstracting, by the system, the historical dataset and the historical configuration setting into the defined embedding format. An advantage of such a computer-implemented method can be embedding historical data into a format that can be utilized by one or more learning-based architectures to autonomously identify similarities between a given machine learning task and existing machine learning models.

According to an embodiment, a computer program product for accelerating execution of a machine learning task is provided. The computer program product can comprise a computer readable storage medium having program instructions embodied therewith. The program instructions can be executable by a processor to cause the processor to execute, by the processor, a machine learning task using an existing artificial intelligence model on a sample dataset based on a similarity between the sample dataset and a historical dataset, wherein the existing artificial intelligence model is generated by automated machine learning and trained on the historical dataset. An advantage of such a computer program product can be the use of historical artificial intelligence model results to accelerate execution of, and/or more efficiently execute, a machine learning task.

In some examples, the program instructions can further cause the processor to run, by the processor, the existing artificial intelligence model on the sample dataset with a configuration setting based on a similarity score being greater than a defined threshold. An advantage of such a computer program product can be the use of transfer learning in an automated machine learning process.

BRIEF DESCRIPTION OF THE DRAWINGS

FIG. 4 illustrates a diagram example, non-limiting tables that can be utilized to embed one or more datasets and/or configuration settings regarding one or more machine learning tasks in accordance with one or more embodiments described herein.

FIG. 8 illustrates a flow diagram of an example, non-limiting computer-implemented method that can utilized transfer learning to accelerate training of an artificial intelligence model generated by an automated machine learning system in accordance with one or more embodiments described herein.

FIG. 9 illustrates a flow diagram of an example, non-limiting computer-implemented method that can utilized transfer learning to accelerate training of an artificial intelligence model generated by an automated machine learning system in accordance with one or more embodiments described herein.

DETAILED DESCRIPTION

Figure 1:
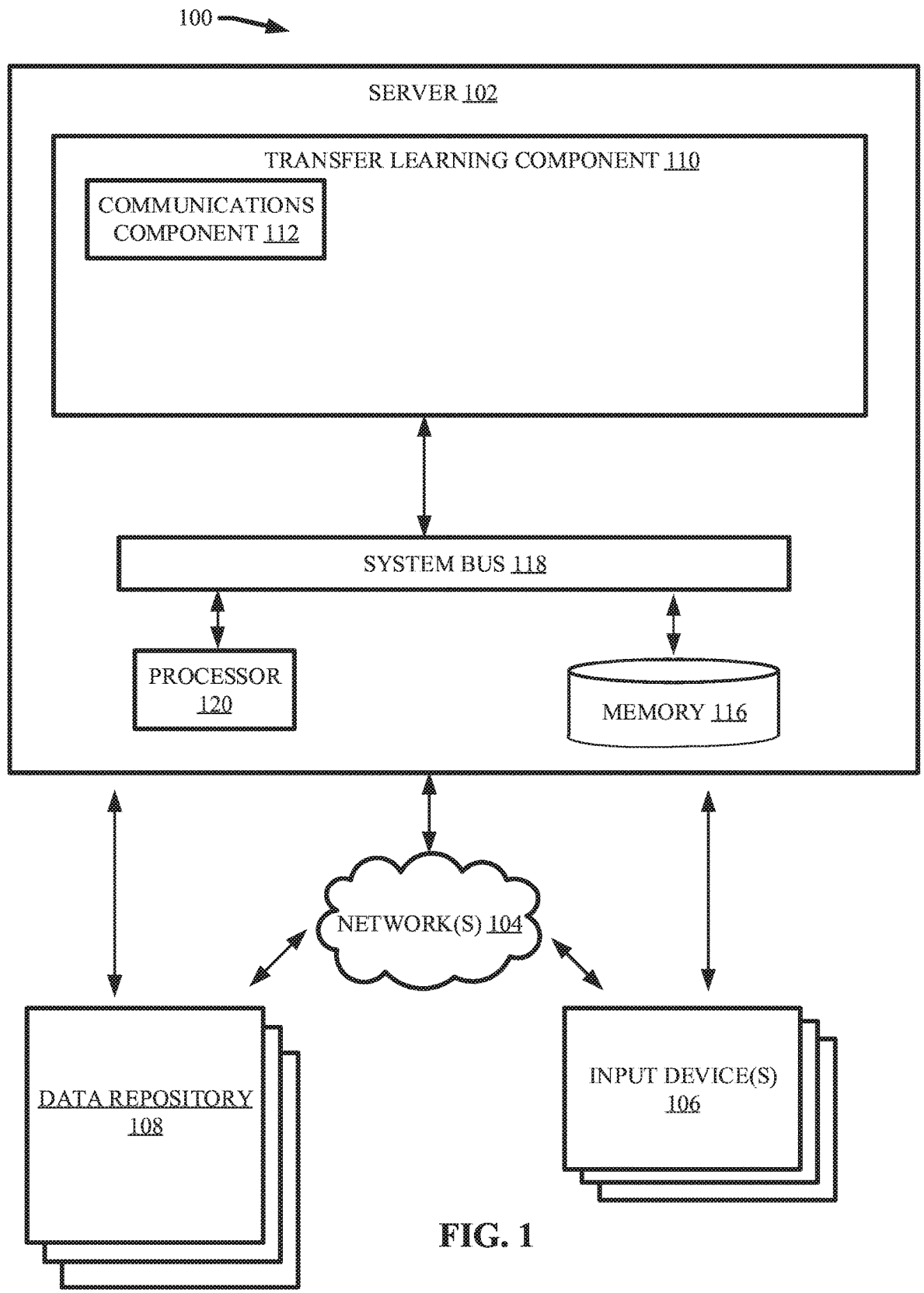
FIG. 1 illustrates a block diagram of an example, non-limiting system that can utilized transfer learning to accelerate training of an artificial intelligence model generated by an automated machine learning system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of automated machine learning systems; the present disclosure can be implemented to produce a solution to one or more of these problems by utilizing transfer learning to accelerate training of an artificial intelligence model generated by an automated machine learning system. Advantageously, one or more embodiments described herein can identify similarities between machine learning tasks previous completed by an automated machine learning system and a new machine learning task. Thereby, various embodiments described herein can more efficiently and/or expeditiously execute machine learning tasks by learning from previously established artificial intelligence model results.

Various embodiments of the present invention can be directed to computer processing systems, computer-implemented methods, apparatus and/or computer program products that facilitate efficient, effective, and autonomous (e.g., without direct human guidance) transfer learning across artificial intelligence models generated by an automated machine learning system. For example, in one or more embodiments described herein can comprise receiving one or more historical datasets and/or configuration settings used by an automated machine learning system to train existing artificial intelligence models. Further, various embodiments can receive one or more sample datasets and/or configuration settings to be utilized to complete a machine learning task. One or more embodiments described herein can calculate one or more similarity scores between the one or more historical datasets and sample datasets and/or between the one or more historical configuration settings and sample configuration settings. Additionally, the various embodiments can utilize the one or more calculated similarity scores to determine a best-fit existing artificial intelligence model (e.g., including a historical dataset and/or configuration setting) with regards to the given machine learning task. Further, the various embodiments can adapt the existing artificial intelligence model to complete the machine learning task on the sample dataset while using the previously established model results to accelerate training of the adapted artificial intelligence model.

The computer processing systems, computer-implemented methods, apparatus and/or computer program products employ hardware and/or software to solve problems that are highly technical in nature (e.g., adapting existing artificial intelligence models based similarities with a given machine learning task), that are not abstract and cannot be performed as a set of mental acts by a human. For example, an individual, or a plurality of individuals, cannot analyze the vast amount of data and/or parameters associated with multiple artificial intelligence systems as efficiently or expeditiously as the various embodiments described herein.

Also, one or more embodiments described herein can constitute a technical improvement over conventional automated machine learning systems by learning from the results of past artificial intelligence models to accelerate the autonomous generation and/or training of an artificial intelligence model for a given machine learning task. Additionally, various embodiments described herein can demonstrate a technical improvement over conventional automated machine learning systems by identifying similarities between previous artificial intelligence jobs and a given machine learning task to facilitate a transfer learning process. For example, various embodiments described herein can result in greater efficiency of operation of the automated machine learning system by transferring artificial intelligence model results across machine learning jobs to learn from past operations.

Further, one or more embodiments described herein can have a practical application by enabling automated machine learning systems to learn from past machine learning tasks when developing an artificial intelligence model for new machine learning task. For instance, various embodiments described herein can shorten the end-to-end processing performed by an automated machine learning system by building upon historical model results. One or more embodiments described herein can control one or more automated machine learning systems so as to transfer existing artificial intelligence model results on a dataset previously generated by the automated machine learning system to a new dataset. Thereby, the one or more embodiments, can accelerate execution of a machine learning task by not running an expensive full automated machine learning computation. For instance, various embodiments described herein can control one or more learning-based software architectures with one or more neural networks to compare automated machine learning datasets and/or configurations across multiple machine learning tasks.

As used herein, the terms "automated machine learning" and/or "automated machine learning system" can refer to the use of software, computer programs, and/or algorithms to generate, develop, and/or optimize an artificial intelligence model via artificial intelligent technologies. For example, automated machine learning can comprise autonomous completion of an end-to-end development process for one or more artificial intelligent models. One of ordinary skill in the art will recognize that the end-to-end development process, which can be autonomously completed by an automate machine learning system, can include, for example, the steps of: data collection, data cleansing, feature engineering, model selection, parameter optimization, ensemble, model validation, model deployment, runtime monitoring, and/or model improvement. Automated machine learning systems can autonomously perform the end-to-end development process to generate one or more artificial intelligent models and/or complete one or more machine learning tasks.

As used herein the terms "machine learning task" and/or "machine learning tasks" can refer to an application of artificial intelligence technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering. Execution of a machine learning tasks can be facilitated by one or more artificial intelligence models trained on one or more datasets in accordance with one or more model configuration settings.

As used herein the terms "artificial intelligence model" and/or "artificial intelligence models" can refer to one or more computer models that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Artificial intelligence models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or datasets used to train one or more artificial intelligence models. As an artificial intelligence model trains (e.g., utilizes more training data), the computer model can become increasingly accurate; thus, trained artificial intelligence models can accurately analyze data with unknown outcomes, based on lessons learning from training data, to facilitate one or more machine learning tasks. Example artificial intelligence models can include, but are not limited to: neural networks ("NN"), perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), neural turing machine ("NTM"), a combination thereof and/or the like.

As used herein the terms "transfer learning process" and/or "transfer learning processes" can refer to an artificial intelligence technology that can use learned outcomes (e.g., results from pre-existing artificial intelligence models) gained from performing a machine learning task as a foundation for executing another machine learning task. For example, a transfer learning process can comprise the autonomous adaptation of an existing artificial intelligence model (e.g., pre-trained on historical data) to meet one or more configuration settings of a new machine learning task. Wherein the transfer learning processes can further comprise running the adapted, pre-existing artificial intelligence model on a new dataset to complete the new machine learning task. The adapted, pre-existing artificial intelligence model can be generated by the transfer learning process via a combination and/or alteration of one or more pre-existing, pre-trained artificial intelligence models. Additionally, the adapted, pre-existing artificial intelligence model can be fine-tuned by the transfer learning process based on one or more characteristics of the new dataset to be analyzed by the one or more new machine learning tasks.

FIG. 1 illustrates a block diagram of an example, non-limiting system 100 that can apply one or more transfer learning processes to one or more artificial intelligent models generated by an automated machine learning system. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, input devices 106, and/or data repositories 108. The server 102 can comprise transfer learning component 110. The transfer learning component 110 can further comprise communications component 112. Also, the server 102 can comprise or otherwise be associated with at least one memory 116. The server 102 can further comprise a system bus 118 that can couple to various components such as, but not limited to, the transfer learning component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or data repositories 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the transfer learning component 110 can be provided on the one or more servers 102, it should be appreciated that the architecture of system 100 is not so limited. For example, the transfer learning component 110, or one or more components of the transfer learning component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter one or more sample datasets and/or model configuration settings into the system 100, thereby sharing (e.g., via a direct connection and/or via the one or more networks 104) said data with the server 102. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, the one or more input devices 106 can be employed to enter one or more objectives and/or goals of a machine learning task into the system 100. For example, the one or more objectives and/or goals can delineate classification functions, clustering functions, and/or regression functions to be performed by the machine learning task. Further, the one or more input devices 106 can be employed to enter one or more sample datasets into the system 100. For example, the one or more sample datasets can comprise data to be analyzed by one or more given machine learning tasks. Additionally, the one or more input devices 106 can be employed to enter one or more sample configuration settings into the system 100. The one or more sample configuration settings can delineate one or more parameters of the given machine learning task and/or an artificial intelligence model used to execute the machine learning task. Example sample configuration settings can include, but are not limited to: prediction types, target columns, optimization object metrics, a combination thereof, and/or the like.

In various embodiments, the one or more data repositories 108 can comprise historical datasets and/or historical configuration settings used by one or more automated machine learning systems in the past to generate one or more artificial intelligence models and/or execute one or more machine learning tasks. For example, the one or more historical datasets can comprise data previously analyzed by one or more automated machine learning systems to generate one or more artificial intelligence models. Additionally, the one or more historical configuration settings can comprise model configuration settings previously utilized by the one or more automated machine learning systems to generate the one or more artificial intelligence models along with the historical datasets. Further, the one or more artificial intelligence models previously generated by one or more automated machine learning systems can be stored in the one or more data repositories as existing artificial intelligence models.

In one or more embodiments, multiple historical datasets, configuration settings, and/or artificial intelligence models can be stored and/or sourced from a plurality of data repositories 108 in communication with the server 102. In one or more embodiments, the one or more data repositories 108 can be in communication with the one or more servers 102 via direct electrical connection and/or via one or more networks 104, such as through a cloud computing environment.

In various embodiments, the communications component 112 can facilitate a sharing of data (e.g., datasets, configuration settings, commands, and/or artificial intelligence models) between the server 102, the one or more input devices 106, and/or the one or more data repositories 108. Additionally, the communications component 112 can facilitate a further sharing of the data with various associate components of the transfer learning component 110 described herein.

Figure 2:
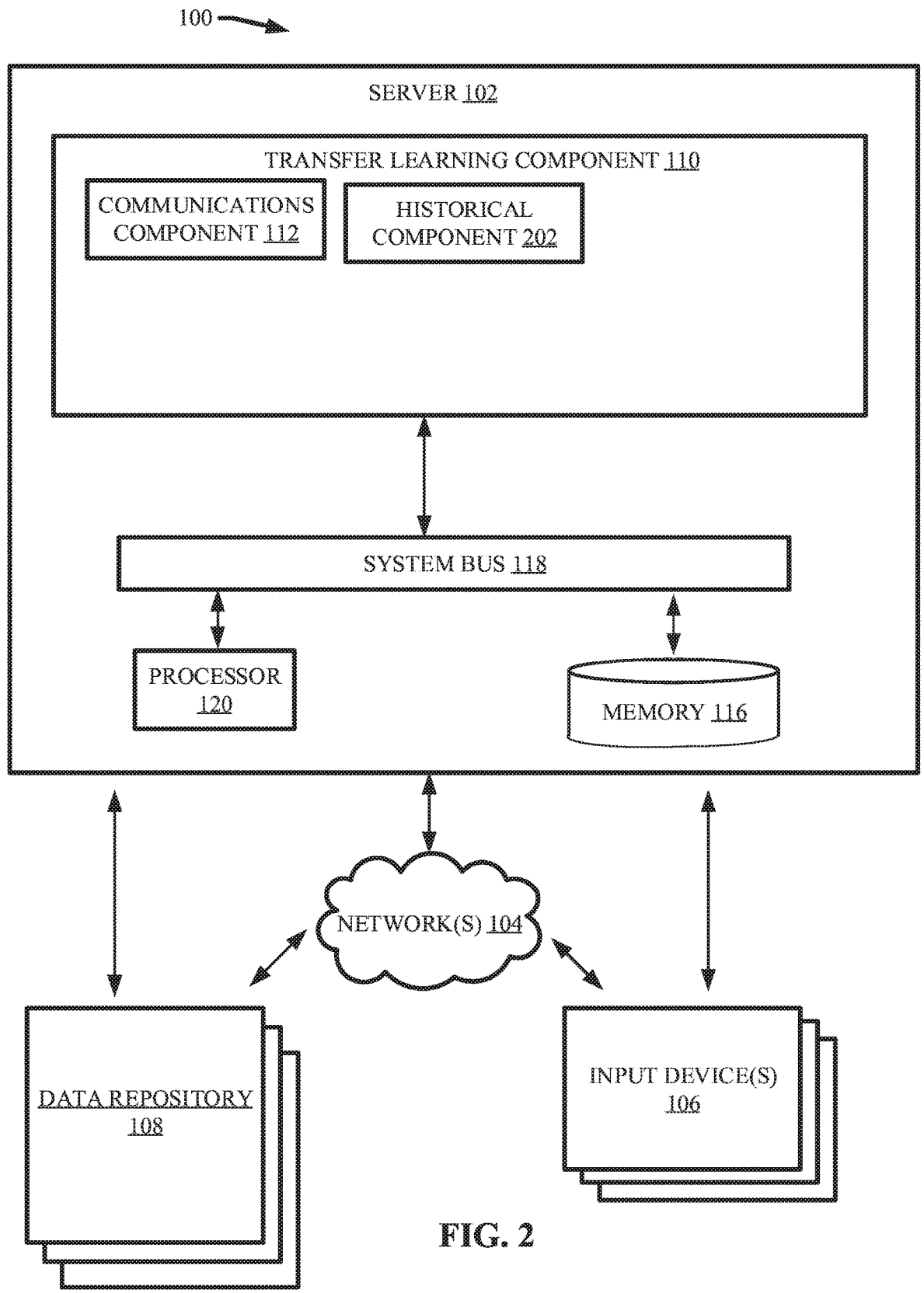
FIG. 2 illustrates a block diagram of an example, non-limiting system that can compile historical records of past datasets and/or configuration settings utilized by an automated machine learning system to generate existing artificial intelligence models in accordance with one or more embodiments described herein.

FIG. 2 illustrates a block diagram of the example, non-limiting system 100 further comprising historical component 202 in accordance with one or more embodiments described herein. Repetitive description of like elements employed in other embodiments described herein is omitted for sake of brevity. In various embodiments, the historical component 202 can generate one or more historical logs compiling data from the one or more data repositories 108 and/or input devices 106.

In one or more embodiments, the historical component 202 can generate one or more historical logs that comprise data from multiple data repositories 108. For example, the one or more historical logs can comprise historical datasets collected from multiple data repositories 108. In another example, the one or more historical logs can comprise historical configuration settings collected from multiple data repositories 108. Further, the one or more historical logs can comprise one or more artificial intelligence models generated based on the historical datasets and/or configuration settings along with one or more results achieved by the one or more artificial intelligence models. Thereby, the historical component 202 can aggregate data relating to various machine learning tasks previously executed by one or more automated machine learning systems. In one or more embodiments, the one or more historical logs can be stored in the memory 116.

Figure 3:
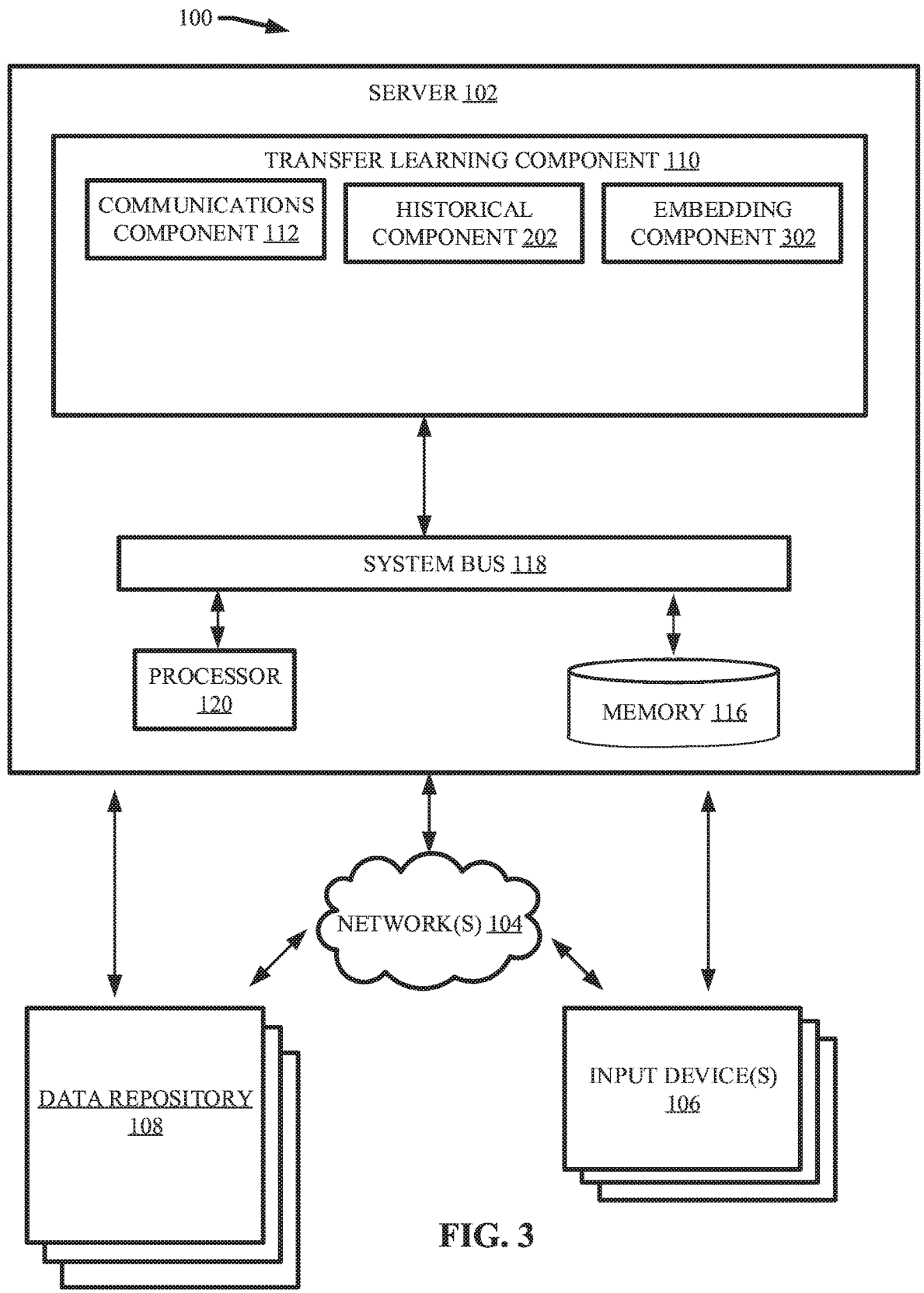
FIG. 3 illustrates a block diagram of an example, non-limiting system that can abstract historical datasets and/or configuration settings along with sample datasets and/or configuration settings into a defined embedding format in accordance with one or more embodiments described herein.

FIG. 3 illustrates a block diagram of the example, non-limiting system 100 further comprising embedding component 302 in accordance with one or more embodiments described herein. Repetitive description of like elements employed in other embodiments described herein is omitted for sake of brevity. In various embodiments, the embedding component 302 can abstract data from the one or more historical logs into one or more defined embedding formats.

In one or more embodiments, the embedding component 302 can generate one or more representation tables that can characterize embeddings of the historical data comprised within the one or more historical logs. For example, the embedding component 302 can abstract the one or more historical datasets of the historical logs into one or more embeddings to populate the one or more representation tables. In another example, the embedding component 302 can abstract the one or more historical configuration settings of the historical logs into one or more embeddings to populate the one or more representation tables.

Additionally, the embedding component 302 can populate the one or more representation tables with embeddings characterizing data entered into the system 100 via the one or more input devices 106. For example, the embedding component 302 can abstract the one or more sample datasets into one or more embeddings to further populate the one or more representation tables. In another example, the embedding component 302 can abstract the one or more configuration settings of the given machine learning task into one or more embeddings to further populate the one or more representation tables.

In various embodiments, the embeddings generated by the embedding component 302, and/or characterized by the one or more representation tables, can process relevant data into a standardized format. For example, the embedding component 302 can abstract the historical datasets, the sample datasets, the historical configuration settings, and/or the sample configuration settings into a defined embedding format so as to facilitate one or more comparisons between the various types of data. For instance, in one or more embodiments the embedding component 302 can generate neural network embeddings to represent the historical datasets, the sample datasets, the historical configuration settings, and/or the sample configuration settings in a standardized format. In various embodiments, the one or more representation tables and/or embeddings can be stored in the one or more memories 116.

FIG. 4 illustrates a diagram of example, non-limiting representation tables that can be generated by the embedding component 302 in accordance with one or more embodiments described herein. Repetitive description of like elements employed in other embodiments described herein is omitted for sake of brevity. The first representation table 402 can characterize embeddings (e.g., neural network embeddings) of the one or more historical datasets and/or sample datasets. The second representation table 404 can characterize embeddings (e.g., neural network embeddings) of the one or more historical configuration settings and/or sample configuration settings. One of ordinary skill in the art will recognize that the format and/or configuration of the representation tables depicted in FIG. 4 is exemplary and alternate formats and/or configurations are also envisaged. The representation tables generated by the embedding component 302, such as those exemplified by the first representation table 402 and/or the second representation table 404, can standardize the format of the relevant data (e.g., the historical datasets, the sample datasets, the historical configuration settings, and/or the sample configuration settings) and/or enable comparisons between the various data types by one or more artificial intelligence technologies.

Figure 5:
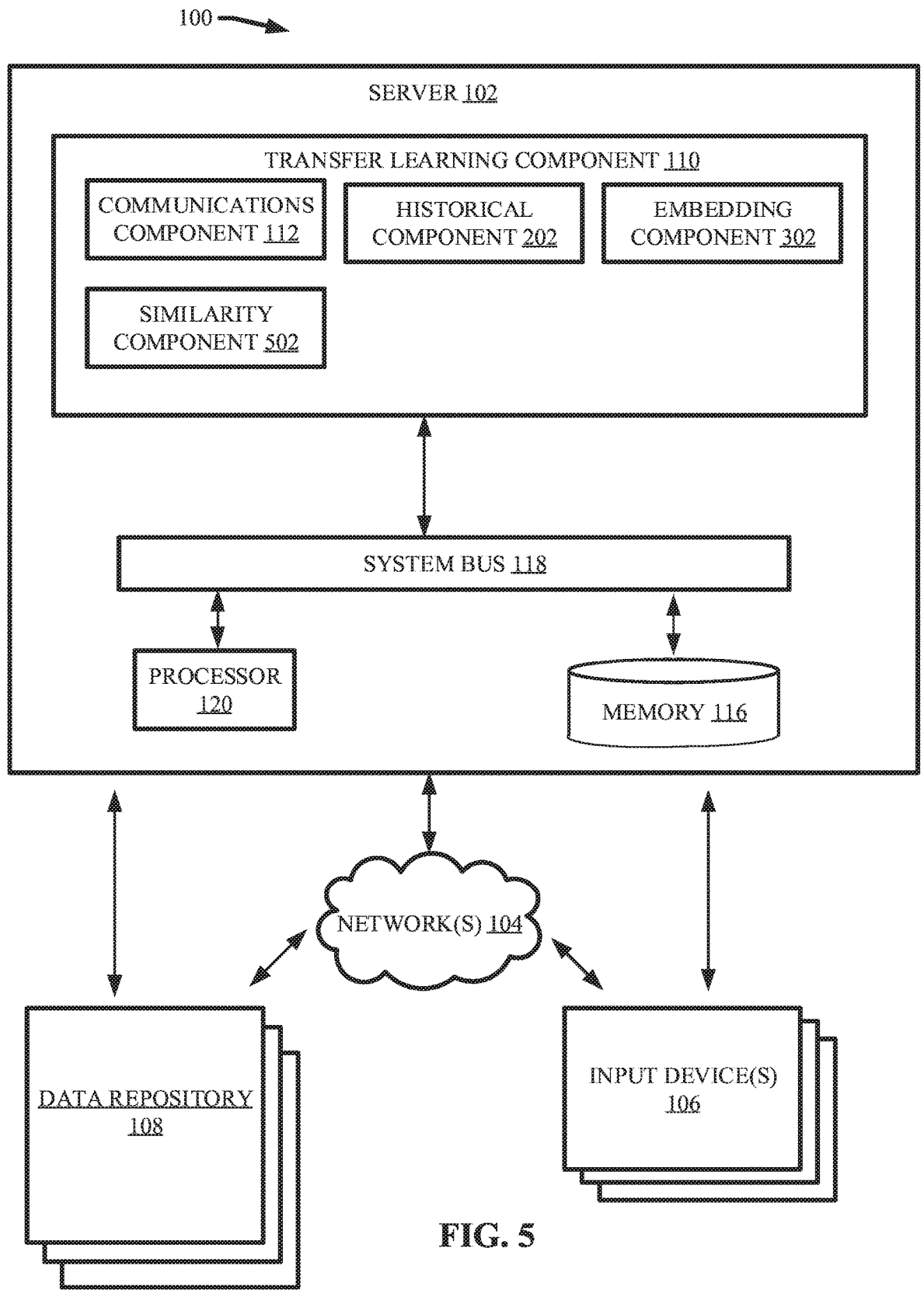
FIG. 5 illustrates a block diagram of example, non-limiting system that can determine an amount of similarity between a given machine learning task and/or sample dataset and an existing artificial intelligence model and/or historical dataset in accordance with one or more embodiments described herein.

FIG. 5 illustrates a block diagram of the example, non-limiting system 100 further comprising similarity component 502 in accordance with one or more embodiments described herein. Repetitive description of like elements employed in other embodiments described herein is omitted for sake of brevity. In various embodiments, the similarity component 502 can employ one or more artificial intelligence models to determine one or more similarities between the historical data and sample data characterized by the representation tables.

In one or more embodiments, the similarity component 502 can employ one or more artificial intelligence models to identify and/or analyze how similar the sample dataset is to respective historical datasets. Further, the similarity component 502 can employ the one or more artificial intelligence models to identify and/or analyze how similar the one or more sample configuration settings are to respective historical configuration settings. Additionally, the similarity component can quantify the amount of similarity between the sample dataset and historical datasets and/or between the sample configuration settings and the historical configuration settings via a similarity score. For instance, the similarity score can be a numerical value ranging from greater than or equal to 0 (e.g., least similar) and less than or equal to 1 (e.g., most similar). For example, the similarity component 502 can enter the one or more embeddings generated by the embedding component 302 (e.g., neural network embeddings) into one or more artificial intelligence models (e.g., neural network models, SVMs, and/or cosine similarity types of machine learning algorithms) to determine the similarity scores.

Further, the similarity component 502 can generate a similarity table and/or populate the similarity table with the similarity scores and/or associate data. For instance, the similarity table can present the similarity score, historical dataset, historical configuration setting, and/or artificial intelligence model (e.g., including model results) for each machine learning task (e.g., each machine learning job) executed by one or more automated machine learning systems. Wherein the similarity score associated with each machine learning task (e.g., machine learning job) can quantify how similar the previous machine learning task, and thereby artificial intelligence model, is to the given machine learning task based on a comparison: between the historical dataset associated with the previous machine learning task and the sample dataset associated with the given machine learning task; and/or between the historical configuration settings of the previous machine learning task and the sample configuration settings of the given machine learning task.

In various embodiments, the one or more historical logs can comprise relevant data regarding multiple past machine learning tasks. Thereby, the one or more representation tables can characterize embeddings regarding multiple past machine learning tasks. Likewise, the one or more similarity tables can include a similarity score for each of the multiple past machine learning tasks. Thus, the historical component 202, embedding component 302, and similarity component 502 can, in combination, compare a sample dataset and/or sample configuration setting of a given machine learning task to multiple historical datasets and/or historical configuration settings of multiple past machine learning tasks to determine a similarity between the given machine learning task and the respective past machine learning tasks. In various embodiments, the one or more similarity tables can be stored in the one or more memories 116.

Figure 6:
FIG. 6 illustrates a diagram of an example, non-limiting similarity table that can facilitate a comparison of similarity scores between previously execute machine learning jobs and a given machine learning task in accordance with one or more embodiments described herein.

FIG. 6 illustrates a diagram of example, non-limiting similarity table 600 that can be generated by the similarity component 502 in accordance with one or more embodiments described herein. Repetitive description of like elements employed in other embodiments described herein is omitted for sake of brevity. As shown in FIG. 6, the exemplary similarity table 600 can include a similarity score for each of the past machine learning jobs executed by the automated machine learning system, thereby comparing the past machine learning jobs to the given machine learning job. For example, the similarity table 600 can delineate the past machine learning tasks (e.g., "Jobs"), the historical datasets (e.g., "Dataset") associated with each past machine learning task, the configuration setting (e.g., "Configuration Setting") of the past machine learning tasks, the artificial intelligence model and/or model results (e.g., "Result Pipelines") associated with each past machine learning task, and/or the similarity scores (e.g., "Similarity Score") determined by the similarity component 502.

One of ordinary skill in the art will recognize that the format and/or configuration of the similarity table 600 is exemplary and alternate formats and/or configurations are also envisaged. The similarity tables generated by the similarity component 502, such as those exemplified by the similarity table 600, can present the amount of similarity between a sample dataset and/or configuration setting pairing with historical dataset and/or configuration setting pairings.

Figure 7:
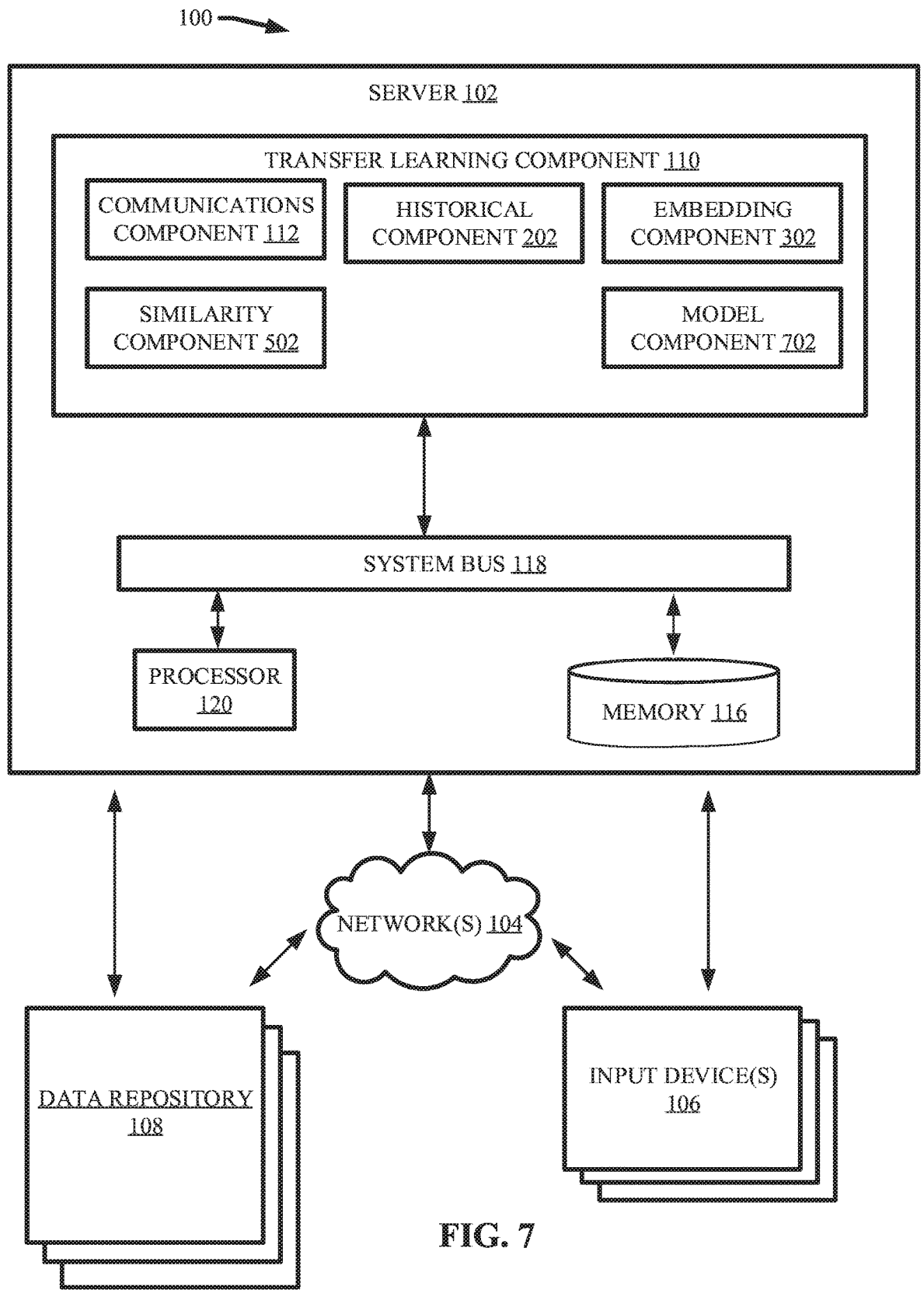
FIG. 7 illustrates a block diagram of an example, non-limiting system that can perform one or more transfer learning processes to adapt an existing artificial intelligence model to execute a machine learning task on a sample dataset in accordance with one or more embodiments described herein.

FIG. 7 illustrates a block diagram of the example, non-limiting system 100 further comprising model component 702 in accordance with one or more embodiments described herein. Repetitive description of like elements employed in other embodiments described herein is omitted for sake of brevity. In various embodiments, the model component 702 can run an existing artificial intelligence model on the sample dataset with the sample configuration setting based on a similarity score being greater than or equal to a defined threshold.

In various embodiments, the model component 702 can analyze the similarity scores generated by the similarity component 502 (e.g., by analyzing the one or more similarity tables) to identify one or more past machine learning tasks that are most similar to the given machine learning task. For example, the model component 702 can compare the similarity scores included in the similarity table to identify the largest similarity score, and/or identify the past machine learning task associated with the largest similarity score as the past machine learning task that is most similar to the given machine learning task. Further, the model component 702 can perform one or more transfer learning processes on the model results achieved by past execution of the identified historical machine learning task by running the sample dataset on an adapted version of the existing artificial intelligence model previously generated and/or trained by the automated machine learning system during execution of the identified historical machine learning task. For example, the existing artificial intelligence model can be adapted by the one or more transfer learning processes to meet the one or more sample configuration settings of the given machine learning task.

Thereby, the model component 702 can identify the historical machine learning task that is most similar to the given machine learning task; select the existing artificial intelligence model generated and/or trained through past execution of the identified historical machine learning task; and perform one or more transfer learning processes to run the existing artificial intelligence model on the sample dataset and leverage the learned outcomes achieved by past results of the model. For instance, the one or more transfer learning processes can adapt the existing artificial intelligence model to meet the one or more sample configuration settings of the given machine learning task. By selecting the existing artificial intelligence model from a plurality of existing artificial intelligence models (e.g., associated with multiple past machine learning tasks) based on a similarity between the historical data and the sample data, the model component 702 can select the existing artificial intelligence model that is most likely to provide accurate results in the context of the given machine learning task. Further, by implementing one or more transfer learning processes using the selected existing artificial intelligence model, the model component 702 can execute the given machine learning task more efficiently and/or expeditiously (e.g., as compared to building a new artificial intelligence model for the given machine learning task) by building upon established model results.

FIG. 8 illustrates a flow diagram of an example, non-limiting computer-implemented method 800 that can facilitate applying one or more transfer learning processes to one or more artificial intelligence models generated by one or more automated machine learning systems in accordance with one or more embodiments described herein. Repetitive description of like elements employed in other embodiments described herein is omitted for sake of brevity.

At 802, the computer-implemented method 800 can comprise employing (e.g., via similarity component 502), by a system 100 operatively coupled to a processor 120, one or more artificial intelligence models to determine a similarity score that characterizes a similarity between one or more sample datasets and one or more historical datasets. In various embodiments, the similarity score can further characterize a similarity between one or more sample configuration settings and one or more historical configuration settings. The one or more historical datasets and/or configuration settings can be associated with one or more previous machine learning tasks executed by an automated machine learning system. Further, as described herein, the one or more sample datasets, historical datasets, sample configuration settings, and/or historical configuration settings can be abstract, by the system 100, into one or more embeddings (e.g., neural network embeddings) represented by one or more representation tables.

At 804, the computer-implemented method 800 can comprise executing (e.g., via model component 702), by the system 100, one or more machine learning tasks using one or more existing artificial intelligence models on the one or more sample datasets based on the similarity score, wherein the one or more existing artificial intelligence models can be generated by automated machine learning and/or trained on the one or more historical datasets. For example, at 804 the computer-implemented method 800 can include performing (e.g., via model component 702) one or more transfer learning processes to adapt the one or more existing artificial intelligence models to meet the one or more sample configuration settings; thereby seizing advantage of the previous results achieved by the existing artificial intelligence model in previous operations.

FIG. 9 illustrates a flow diagram of an example, non-limiting computer-implemented method 900 that can facilitate applying one or more transfer learning processes to one or more artificial intelligence models generated by one or more automated machine learning systems in accordance with one or more embodiments described herein. Repetitive description of like elements employed in other embodiments described herein is omitted for sake of brevity.

At 902, the computer-implemented method 900 can comprise generating (e.g., via historical component 202), by a system 100 operatively coupled to a processor 120, one or more historical logs that can include one or more historical datasets and/or historical configuration settings. The one or more historical datasets and/or configuration settings can be associated with one or more previous machine learning tasks executed by an automated machine learning system. For example, the one or more historical datasets and/or configuration settings can regard one or more artificial intelligence models previously generated and/or developed via automated machine learning.

At 904, the computer-implemented method 900 can comprise abstracting (e.g., via embedding component 302), by the system 100, the one or more historical datasets and/or historical configuration settings into a defined embedding format. For instance, the computer-implemented method 900 can comprise generating one or more embeddings characterizing the one or more historical datasets and/or configuration settings for use within an artificial intelligence model, such as generating neural network embeddings for a neural network model. As described herein, the one or more embeddings an be compiled within one or more representation tables (e.g., generated by the embedding component 302).

At 906, the computer-implemented method 900 can comprise abstracting (e.g., via the embedding component 302), by the system 100, one or more sample datasets and/or sample configuration settings into the defined embedding format. For instance, the computer-implemented method 900 can comprise generating one or more embeddings characterizing the one or more sample datasets and/or sample configuration settings for use within one or more artificial intelligence models, such as generating neural network embeddings for a neural network model. As described herein, the one or more embeddings an be compiled within one or more representation tables (e.g., generated by the embedding component 302).

At 908, the computer-implemented method 900 can comprise employing (e.g., via similarity component 502), by the system 100, one or more artificial intelligence models to determine one or more similarity scores that can characterize a similarity between the one or more sample datasets and the one or more historical datasets based on the defined embedding format. In various embodiments, the similarity score can further characterize a similarity between one or more sample configuration settings and one or more historical configuration settings. In one or more embodiments, the computer-implemented method 900 can include populating one or more similarity tables with the one or more similarity scores. As described herein, the one or more similarity tables can present the one or more similarity scores along with relevant data associated with historical machine learning tasks characterized by the respective similarities scores.

At 910, the computer-implemented method 900 can comprise executing (e.g., via model component 702), by the system 100, one or more machine learning tasks using one or more existing artificial intelligence models on the one or more sample datasets based on the one or more similarity scores. Further, the one or more existing artificial intelligence models can be previously generated by automated machine learning and/or trained on the one or more historical datasets. For example, at 910 the computer-implemented method 900 can include performing (e.g., via model component 702) one or more transfer learning processes to adapt the one or more existing artificial intelligence models to meet the one or more sample configuration settings; thereby seizing advantage of the previous results achieved by the existing artificial intelligence model in previous operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
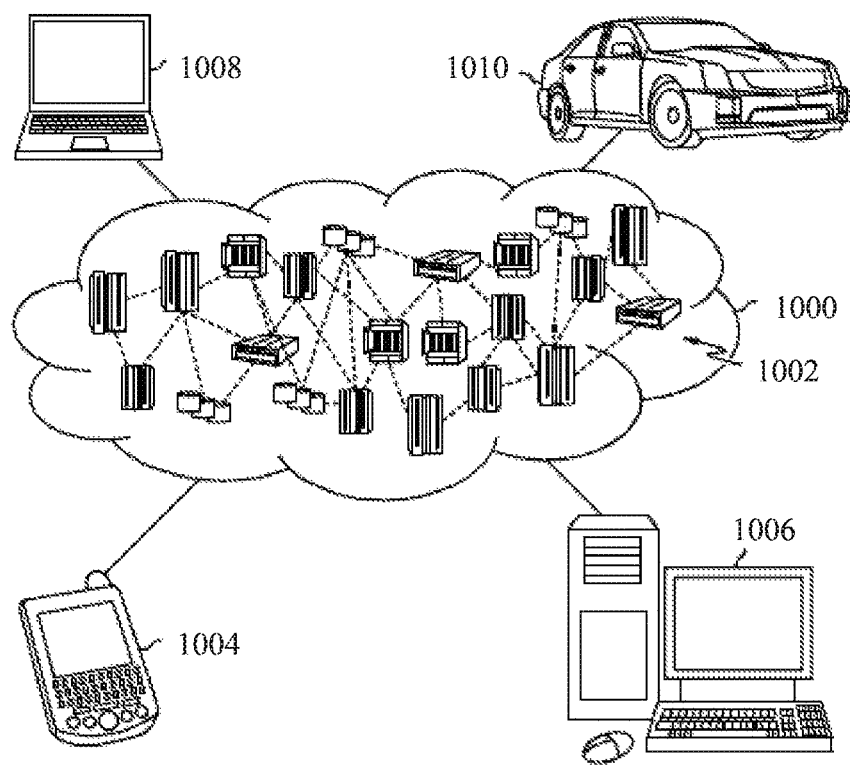
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
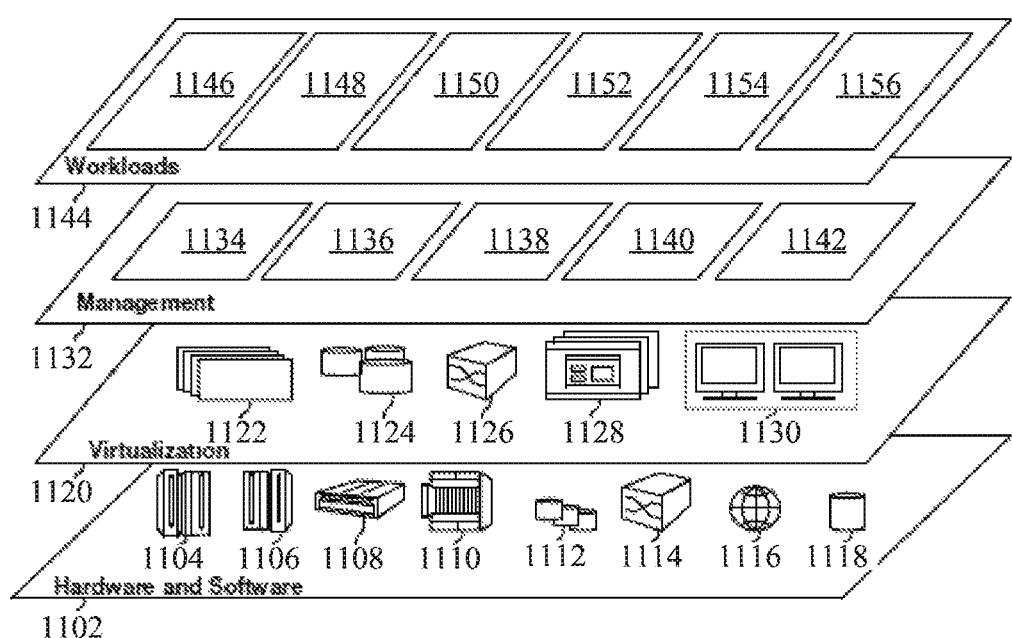
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and transfer learning processing 1156. Various embodiments of the present invention can utilize the cloud computing environment described with reference to FIGS. 10 and 11 to determine similarities between a given machine learning task and historical machine learning tasks and perform transfer learning processes on artificial intelligence models generated by automated machine learning based on the determined similarities.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
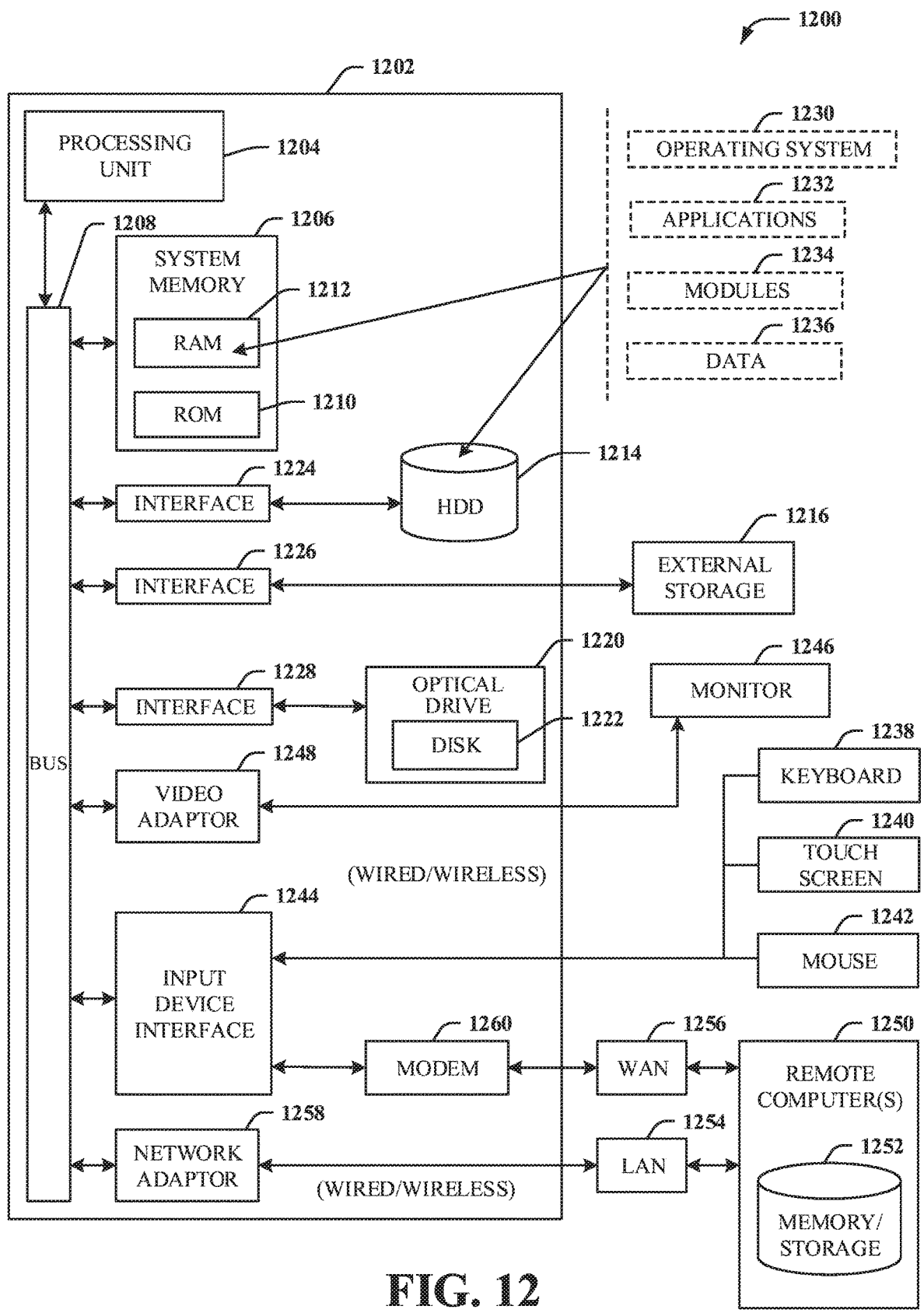
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      an embedding component that:
         encodes a sample dataset and sample configuration settings associated with a machine learning task into sample neural network embeddings in a defined neural network embedding format associated with a neural network,
         encodes historical datasets and corresponding historical configuration settings respectively associated with existing artificial intelligence models into respective historical neural network embeddings associated with the existing artificial intelligence models, in the defined neural network embedding format, wherein the existing artificial intelligence models have been trained using an end-to-end development process and comprise respective historical model results from the training;
      a similarity component that identifies, using the neural network, an existing artificial intelligence model of the existing artificial intelligence models that has a respective historical neural network embeddings that matches the sample neural network embeddings according to a defined similarity criterion; and
      a transfer learning component that generates an artificial intelligence model for the machine learning task, wherein generating the artificial intelligence model for the machine learning task comprises:
         training, via a transfer learning process that is shorter according to a defined criterion than the end-to-end development process and builds on the historical model results from the end-to-end development process of the existing artificial intelligence model, the existing artificial intelligence model for the machine learning task using the sample dataset with the sample configuration settings, wherein the defined criterion is based on at least one of time or system resource usage.

2. The system of claim 1, further comprising:
   a historical component that generates at least one historical log that comprises the historical datasets and the corresponding historical configuration settings, wherein the existing artificial intelligence models were respectively trained on the historical datasets using the corresponding historical configuration settings.

3. The system of claim 1, wherein the similarity component determines, using the neural network, respective similarity scores between the sample neural network embeddings and the respective historical neural network embeddings.

4. The system of claim 3, wherein the defined similarity criterion comprises the respective similarity score associated with the respective historical neural network embedding associated with the existing artificial intelligence model being greater than a defined threshold.

5. The system of claim 3, wherein the similarity component selects the existing artificial intelligence model having a highest similarity score.

6. The system of claim 1, wherein the end-to-end development process comprises at least two steps from a group of steps comprising data collection, data cleansing, feature engineering, model selection, parameter optimization, ensemble, model validation, model deployment, runtime monitoring, and model improvement.

7. The system of claim 1, wherein the embedding component generates one or more representation tables that characterize the sample neural network embeddings and the respective historical neural network embeddings.

8. A computer-implemented method, comprising:
   encoding, by a system operatively coupled to a processor, a sample dataset and sample configuration settings associated with a machine learning task into sample neural network embeddings in a defined neural network embedding format associated with a neural network;
   encoding, by the system, historical datasets and corresponding historical configuration settings respectively associated with existing artificial intelligence models into respective historical neural network embeddings associated with the existing artificial intelligence models, in the defined neural network embedding format, wherein the existing artificial intelligence models have been trained using an end-to-end development process and comprise respective historical model results from the training;
   identifying, by the system, using the neural network, an existing artificial intelligence model of the existing artificial intelligence models that has a respective historical neural network embeddings that matches the sample neural network embeddings according to a defined similarity criterion; and
   generating, by the system, an artificial intelligence model for the machine learning task, wherein generating the artificial intelligence model for the machine learning task comprises:
      training, via a transfer learning process that is shorter according to a defined criterion than the end-to-end development process and builds on the historical model results from the end-to-end development process of the existing artificial intelligence model, the existing artificial intelligence model for the machine learning task using the sample dataset with the sample configuration settings, wherein the defined criterion is based on at least one of time or system resource usage.

9. The computer-implemented method of claim 8, further comprising:
   generating, by the system, at least one historical log that comprises the historical datasets and the corresponding historical configuration settings, wherein the existing artificial intelligence models were respectively trained on the historical datasets using the corresponding historical configuration settings.

10. The computer-implemented method of claim 8, further comprising:

determining, by the system, using the neural network, respective similarity scores between the sample neural network embeddings and the respective historical neural network embeddings.

11. The computer-implemented method of claim 10, wherein the defined similarity criterion comprises the respective similarity score associated with the respective historical neural network embedding associated with the existing artificial intelligence model being greater than a defined threshold.

12. The method of claim 10, further comprising selecting, by the system, the existing artificial intelligence model having a highest similarity score.

13. The method of claim 8, wherein the end-to-end development process comprises at least two steps from a group comprising data collection, data cleansing, feature engineering, model selection, parameter optimization, ensemble, model validation, model deployment, runtime monitoring, and model improvement.

14. A computer program product for accelerating execution of a machine learning task, the computer program product comprising a computer readable storage medium having program instructions embodied therewith, the program instructions executable by a processor to cause the processor to:
  encode, by the processor, a sample dataset and sample configuration settings associated with a machine learning task into sample neural network embeddings in a defined neural network embedding format associated with a neural network;
  encode, by the processor, historical datasets and corresponding historical configuration settings respectively associated with existing artificial intelligence models into respective historical neural network embeddings associated with the existing artificial intelligence models, in the defined neural network embedding format, wherein the existing artificial intelligence models have been trained using an end-to-end development process and comprise respective historical model results from the training;
  identifying, by the processor, using the neural network, an existing artificial intelligence model of the existing artificial intelligence models that has a respective historical neural network embeddings that matches the sample neural network embeddings according to a defined similarity criterion; and
  generate, by the processor, an artificial intelligence model for the machine learning task, wherein generating the artificial intelligence model for the machine learning task comprises:
    training, via a transfer learning process that is shorter according to a defined criterion than the end-to-end development process and builds on the historical model results from the end-to-end development process of the existing artificial intelligence model, the existing artificial intelligence model for the machine learning task using the sample dataset with the sample configuration settings, wherein the defined criterion is based on at least one of time or system resource usage.

15. The computer program product of claim 14, wherein the program instructions further cause the processor to:
  generate, by the processor, at least one historical log that comprises the historical datasets and the corresponding historical configuration settings, wherein the existing artificial intelligence models were respectively trained on the historical datasets using the corresponding historical configuration settings.

16. The computer program product of claim 14, wherein the program instructions further cause the processor to:
  determine, by the processor, using the neural network, respective similarity scores between the sample neural network embeddings and the respective historical neural network embeddings.

17. The computer program product of claim 16, wherein the defined similarity criterion comprises the respective similarity score associated with the respective historical neural network embedding associated with the existing artificial intelligence model being greater than a defined threshold.

18. The computer program product of claim 16, wherein the program instructions further cause the processor to:
  select, by the processor, the existing artificial intelligence model having a highest similarity score.

19. The computer program product of claim 16, wherein the program instructions further cause the processor to:
  generate, by the processor, one or more representation tables that characterize the sample neural network embeddings and the respective historical neural network embeddings.

20. The computer program product of claim 14, wherein the end-to-end development process comprises at least two steps from a group of steps comprising data collection, data cleansing, feature engineering, model selection, parameter optimization, ensemble, model validation, model deployment, runtime monitoring, and model improvement.

\* \* \* \* \*